(12) United States Patent
Beifus

(10) Patent No.: US 7,482,770 B2
(45) Date of Patent: Jan. 27, 2009

(54) METHODS AND SYSTEMS FOR PROVIDING PWM CONTROL SIGNALS TO AN ELECTRONICALLY COMMUTATED MOTOR

(75) Inventor: Brian L. Beifus, Fort Wayne, IN (US)

(73) Assignee: Regal-Beloit Corporation, Beloit, WI (US)

( * ) Notice: Subject to any disclaimer, the term of this patent is extended or adjusted under 35 U.S.C. 154(b) by 27 days.

(21) Appl. No.: 11/564,746

(22) Filed: Nov. 29, 2006

(65) Prior Publication Data

US 2007/0120509 A1 May 31, 2007

Related U.S. Application Data

(60) Provisional application No. 60/740,819, filed on Nov. 30, 2005.

(51) Int. Cl.
*H02P 7/06* (2006.01)
(52) U.S. Cl. .................... 318/254.1; 318/138; 318/439; 318/722
(58) Field of Classification Search ................ 318/138, 318/254.1, 439, 720–724, 254
See application file for complete search history.

(56) References Cited

U.S. PATENT DOCUMENTS

| | | | | |
|---|---|---|---|---|
| 4,528,486 A * | 7/1985 | Flaig et al. | ............. | 318/400.21 |
| 4,757,241 A * | 7/1988 | Young | .................... | 318/400.13 |
| 5,319,291 A * | 6/1994 | Ramirez | ................. | 318/400.25 |
| 5,859,510 A * | 1/1999 | Dolan et al. | ........... | 318/400.28 |
| 6,057,664 A * | 5/2000 | Ikawa et al. | .................. | 318/811 |
| 6,137,251 A * | 10/2000 | Huang et al. | ........... | 318/400.12 |
| 6,177,774 B1 * | 1/2001 | Iwashita et al. | ............. | 318/434 |
| 6,525,506 B2 * | 2/2003 | Jin | ............................. | 318/801 |
| 6,528,968 B2 * | 3/2003 | Seima et al. | ................. | 318/811 |
| 6,538,404 B2 * | 3/2003 | Kato et al. | ............. | 318/400.06 |
| 7,045,982 B2 * | 5/2006 | Amakusa | ................ | 318/400.05 |
| 2005/0031322 A1 * | 2/2005 | Boyle et al. | ................. | 388/800 |

* cited by examiner

*Primary Examiner*—Bentsu Ro
*Assistant Examiner*—Thai Dinh
(74) *Attorney, Agent, or Firm*—Armstrong Teasdale LLP

(57) ABSTRACT

A method for controlling the operation of an electronically commutated motor (ECM) with an ECM control assembly is described. The method includes applying a single pulse width modulated (PWM) signal to a plurality of inputs of a power output module. The method also includes controlling the state of input/output (I/O) circuits to allow the PWM signal to pass through a respective one of the power output module inputs and into a respective winding of the ECM at a desired interval.

25 Claims, 4 Drawing Sheets

METHODS AND SYSTEMS FOR PROVIDING PWM CONTROL SIGNALS TO AN ELECTRONICALLY COMMUTATED MOTOR

CROSS REFERENCE TO RELATED APPLICATIONS

This application is entitled to the benefit of, and claims priority to, provisional U.S. Patent Application Ser. No. 60/740,819 filed Nov. 30, 2005, and entitled "Methods And Systems For Providing PWM Control Signals To An Electronically Commutated Motor", which is hereby incorporated by reference in its entirety.

BACKGROUND OF THE INVENTION

This invention relates generally to electronically commutated motors (ECM), and more specifically, to methods and systems for providing pulse width modulated (PWM) control signals to ECMs.

Power control systems for ECMs, also referred to as brushless direct current (DC) motors, may advantageously utilize pulse width modulation techniques for controlling motor operation. In general, such systems employ controllable power switching devices such as, for example, power transistors, silicon controlled rectifiers (SCR) or gate turn-off devices (GTO), serially connected between a power source and appropriate terminals of the motor. For a three phase motor, the system may utilize a three phase bridge arrangement with each of the three motor power terminals being connected to a corresponding leg of the three phase bridge. Each leg of the bridge may include a series connected pair of switching devices, one of the devices being operable to connect the motor terminal to a positive voltage source for supplying current to the motor and the other of the devices being operable to connect the motor terminal to a negative voltage source for allowing current to circulate out of the motor. Each switching device is responsive to a gating signal for becoming conductive and allowing current to pass in the associated winding phase of the motor. The gating signals are coupled to selected ones of the switching devices in an ECM control system in a manner to energize the windings of the motor in a predetermined sequence.

In a PWM system, either a current monitoring circuit or a voltage control circuit is effective to generate drive enable signals when motor current and/or voltage is less than a predetermined value. The drive enable signal, which is the PWM signal, and hereinafter referred to as the PWM enable signal, allows the gating signals to be coupled to the appropriate switching devices. Removal of the PWM enable signal inhibits coupling of the gating signals to the power switching devices.

BRIEF DESCRIPTION OF THE INVENTION

In one aspect, a method for controlling the operation of an electronically commutated motor (ECM) with an ECM control assembly is provided. The method includes applying a single pulse width modulated (PWM) signal to a plurality of inputs of a power output module. The method also includes controlling the state of input/output (I/O) circuits to allow the PWM signal to pass through a respective one of the power output module inputs and into a respective winding of the ECM at a desired interval.

In another aspect, a unit for providing pulse width modulated (PWM) signals to control operation of an electronically commutated motor (ECM) is provided. The unit includes a power output module configured to apply signals to windings of an ECM, the power output module includes a plurality of power output module inputs. The unit also includes a processing device including a single PWM output and a plurality of input/output (I/O) circuits. The unit also includes a network coupling the single PWM output to the plurality of power output module inputs, a respective one of the I/O circuits also coupled to each respective power output module inputs. The processing device is configured to control a state of the I/O circuits thereby controlling through which power output module input the single PWM output is passed for application to a winding of the ECM.

In still another aspect, a system for providing pulse width modulated (PWM) control signals to an electronically commutated motor (ECM) is provided. The system includes an ECM, a power output module, and a unit including a processing device. The processing device includes a PWM output and a plurality of input/output (I/O) circuits. The unit includes a network coupling said PWM output to respective inputs of the power output module, wherein one of the plurality of I/O circuits is also coupled to each respective input of the power output module, the processing device configured to control the state of the I/O circuits.

DETAILED DESCRIPTION OF THE INVENTION

Figure 1:
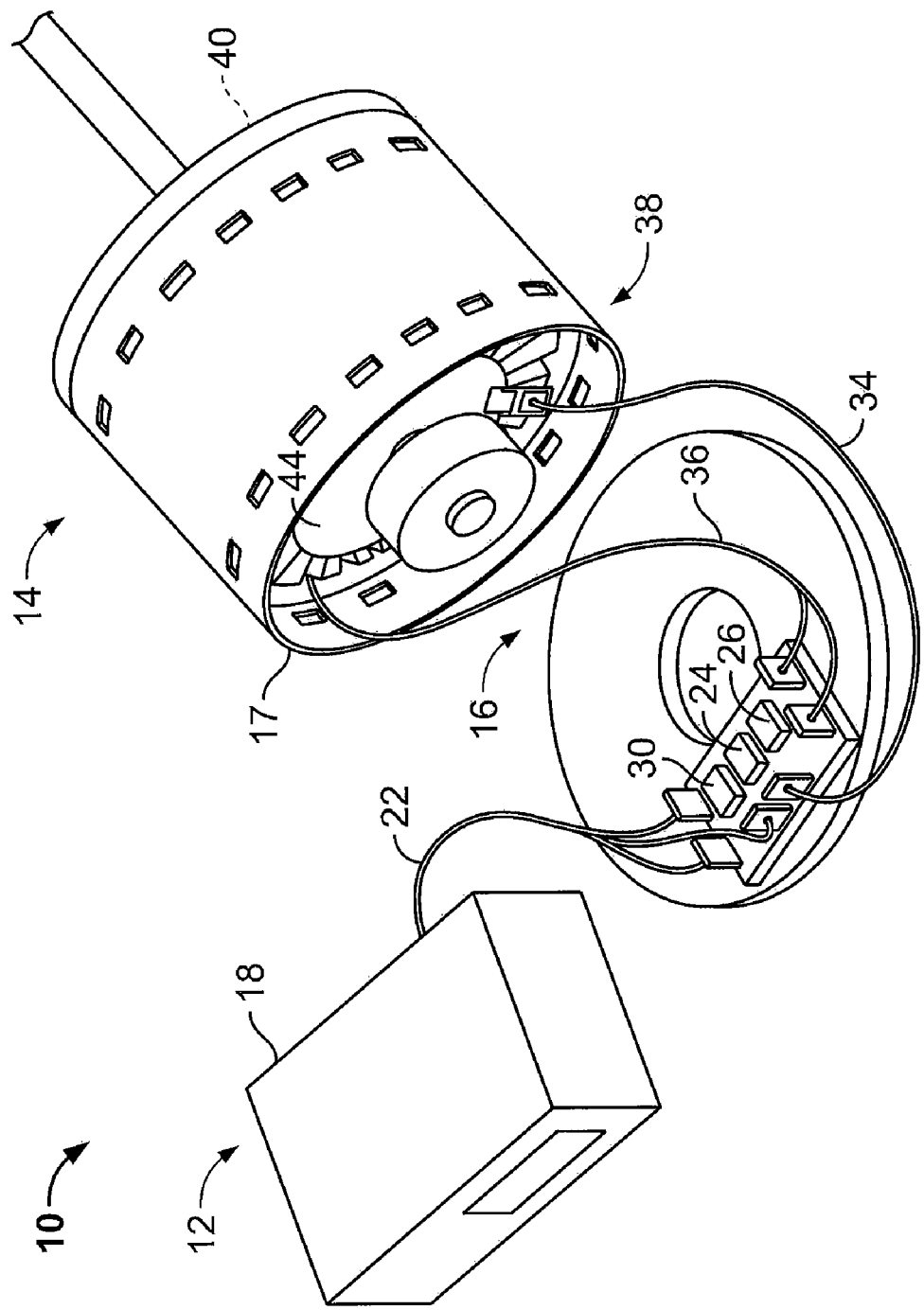
FIG. 1 is an illustration of an electronically commutated motor (ECM) coupled to a motor controller.

FIG. 1 is an illustration of an electronically commutated motor (ECM) control assembly 10 including a control module 12, an ECM 14 (also referred to as a permanent magnet DC brushless motor) and an end shield 16. When fully assembled, end shield 16 and the components mounted thereon, are mechanically coupled to a motor shell 17. Control module 12 includes an enclosure 18 and a printed circuit board (within enclosure 18). In one embodiment, the printed circuit board includes a microprocessor configured to control output signals from the printed circuit board in order to control the operating characteristics of ECM 14.

In another embodiment, the printed circuit board is populated with a plurality of electronic components (not shown) coupled to the printed circuit board and each other to control output signals from the printed circuit board in order to control the operating characteristics of ECM 14. The configuration of the microprocessor and the electronic components is variable, based on at least one requirement of a user. In an exemplary embodiment, control module 12 is mounted remotely from ECM 14 and end shield 16. In another embodiment, control module 12 is mounted to an external surface of ECM 14. In still another embodiment, a plurality of control modules are electrically coupled serially, each control module configured to control a motor operating characteristic.

Control module 12 is electrically coupled to ECM 14 and end shield 16 by a cable 22. Control module 12 is also electrically coupled to a user's power supply and interface circuitry (not shown). The components mounted on end shield 16 include, in one embodiment, a bridge inverter 24 which is electrically coupled to a gate drive circuit 26. Bridge inverter 24 and gate drive circuit 26 are electrically coupled to a low voltage power supply 30. Gate drive circuit 26 is electrically coupled to a motor rotor position sensing circuit by a cable 34. Gate drive circuit 26 is also electrically coupled to ECM 14 by a cable 36.

ECM 14 is a basic permanent magnet DC brushless motor. In the exemplary embodiment, ECM 14 includes a single phase salient pole stator assembly, indicated generally at 38, including a stator core 40 formed from a stack of laminations made of a highly magnetically permeable material, and windings (not shown) of magnet wire wound on stator core 40 in a way known to those of ordinary skill in the art. A rotor 44 includes a rotor core (not shown) formed from a stack of laminations made of a magnetically permeable material substantially received in a central bore of stator core 40. Rotor 44 and stator 38 are illustrated as being solid in FIG. 1 for simplicity, their construction being well known to those of ordinary skill in the art. While FIG. 1 is an illustration of a single phase ECM and associated control circuitry, three phase ECMs and similar associated control circuitry are also known.

Figure 2:
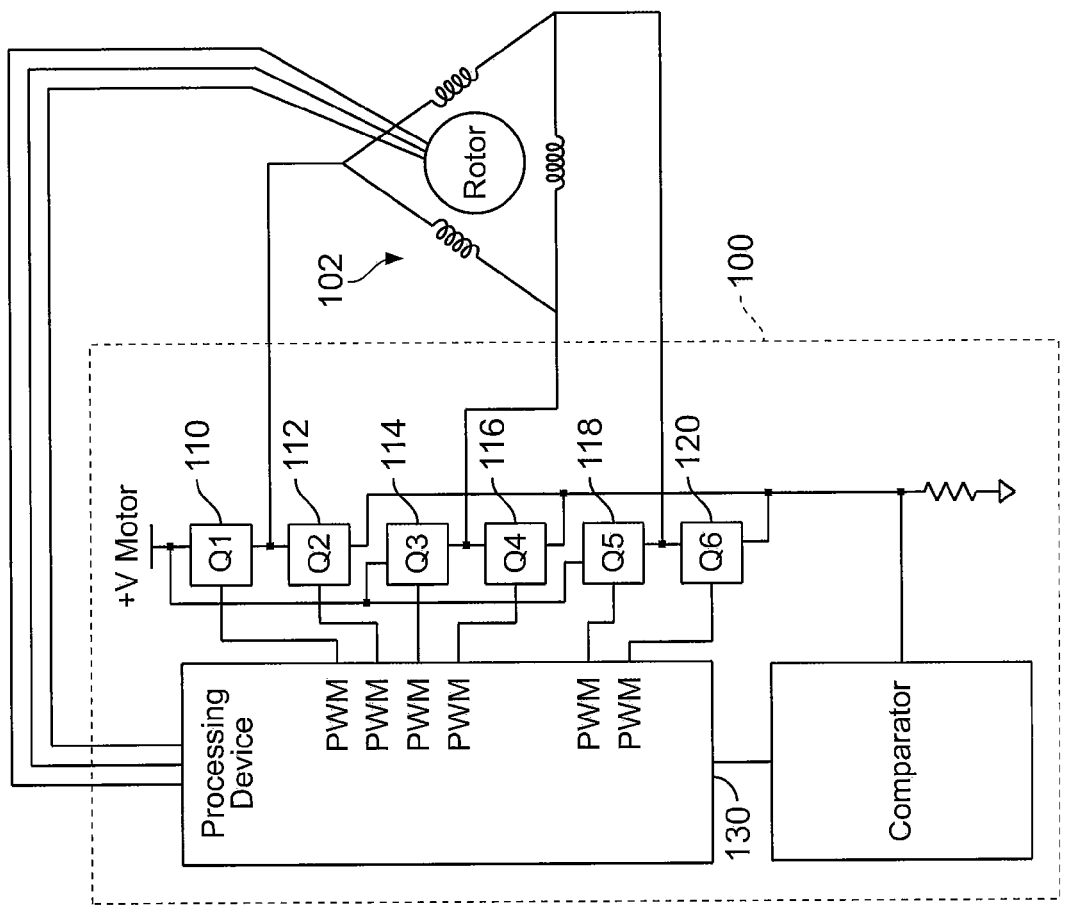
FIG. 2 is a schematic diagram of a known control circuit for an ECM.

FIG. 2 is a schematic diagram of a motor controller 100 for a three phase ECM 102. FIG. 2 is an illustration of one of the known topologies for control of three phase, low cost, brushless DC motors. More specifically, motor controller 100 incorporates six power switches 110, 112, 114, 116, 118, and 120 in a three phase bridge configuration, where one switch at a time is pulse width modulated, and one switch is held in the ON state to control the motor current and voltage. The stator coils are activated, one phase after the other, by these switches, creating the rotating magnetic field necessary to turn the rotor. PWM outputs are provided to switches 110, 112, 114, 116, 118, and 120 from a processing device, for example, microcontroller 130 which provides a separate PWM output for each switch. There are six output states of the bridge formed by switches 110, 112, 114, 116, 118, and 120, each in turn utilizing a different power switch for control.

As illustrated in FIG. 2, if processing device 130 is used to generate the control signals for motor 102, processing device 130 is typically required to include six output channels. Each output channel is capable of providing a PWM, ON, or OFF control output. For operation of motor 102, only one PWM channel is needed at any given time.

Figure 3:
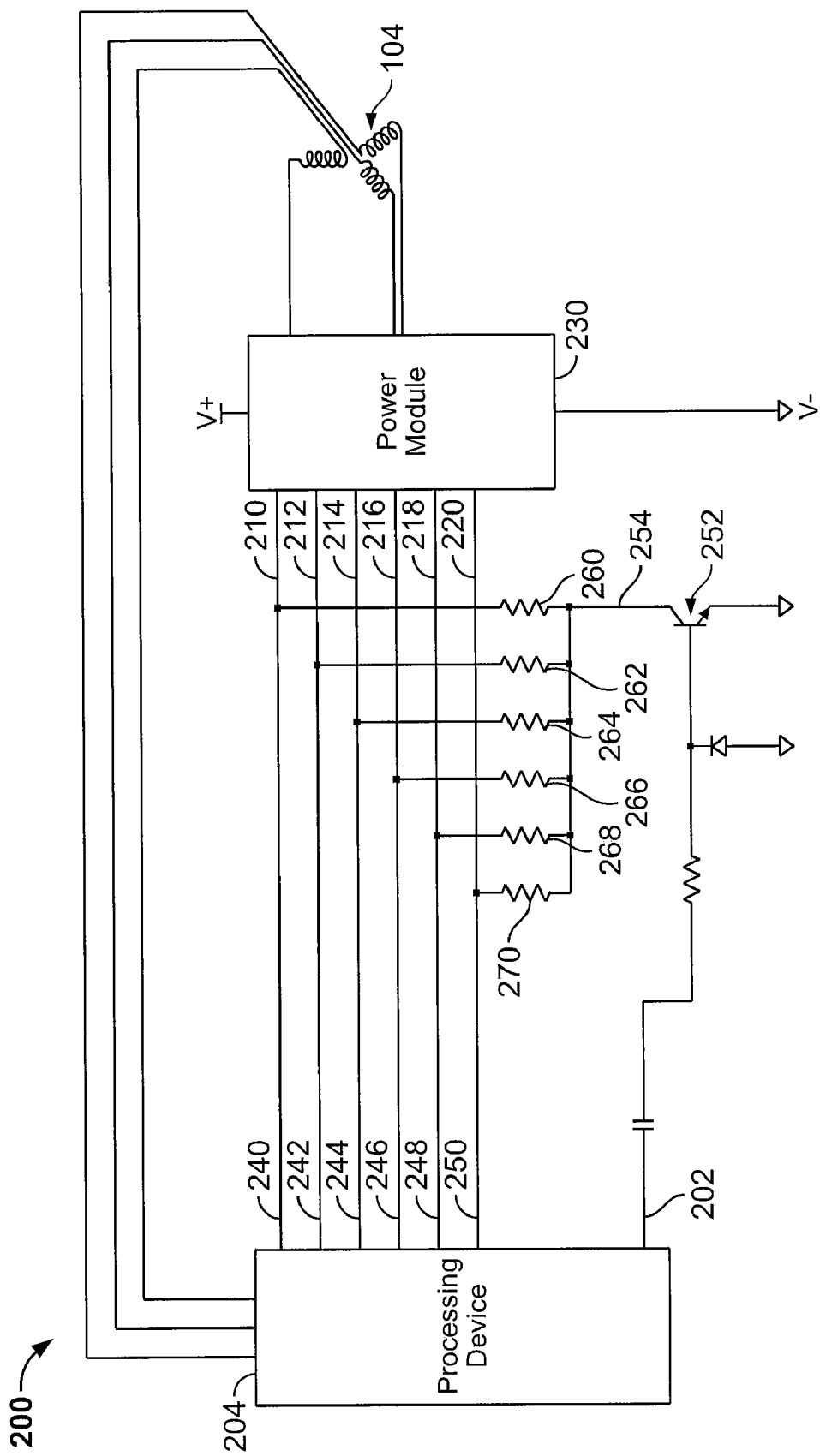
FIG. 3 is a schematic diagram of a controller for an ECM in which the processor includes a single pulse width modulated output.

FIG. 3 is a schematic diagram of a motor controller 200 capable of being utilized with motor 104. ECM 104 includes wye connected windings, however, a motor having delta connected windings, such as ECM 102, may also be controlled by motor controller 200. Motor controller 200 routes a PWM output signal 202 from a processing device 204 to one of six individual inputs 210, 212, 214, 216, 218, and 220, of a power output module 230 at a time when a PWM signal is needed at that specific input. As used herein, the term processing device is not limited to just those integrated circuits referred to in the art as a processing device, but broadly refers to, a processor, a microprocessor, a controller, a microcontroller, a programmable logic controller, an application specific integrated circuit, and other programmable circuits. In one embodiment, power output module 230 is configured as a power bridge, similar to the configuration of switches 110, 112, 114, 116, 118, and 120 of FIG. 2. In the embodiment illustrated in FIG. 3, operation of the six individual inputs 210, 212, 214, 216, 218, and 220 to power output module 230 are controlled utilizing six general purpose input/output (I/O) circuits 240, 242, 244, 246, 248, and 250 of processing device 204.

To achieve PWM control of motor 104, six general purpose I/O circuits 240, 242, 244, 246, 248, and 250 of processing device 204 are coupled to six logic inputs 210, 212, 214, 216, 218, and 220 of power output module 230. PWM output 202 is capacitively coupled to a transistor 252 whose collector 254 connects to six logic inputs 210, 212, 214, 216, 218, and 220 through six resistors 260, 262, 264, 266, 268, and 270 respectively.

Resistors 260, 262, 264, 266, 268, and 270 are configured with resistance values such that high or low logic levels output by processing device 204 at respective I/O circuits 240, 242, 244, 246, 248, and 250 can overpower any signal from transistor 252. The selected resistances for resistors 260, 262, 264, 266, 268, and 270 are such that when I/O circuits 240, 242, 244, 246, 248, and 250 of processing device 204 are in an inactive, or high impedance state, a level of inputs 210, 212, 214, 216, 218, and 220 is controlled by transistor 252.

When motor 104 is to be operated in a 120 degree conduction mode, in any of the six commutation states, one of 210, 212, 214, 216, 218, and 220 will be pulse width modulated, one will be switched ON, and the remaining four will be switched OFF. To implement each commutation state of motor 104, processing device 204 is configured to switch one of I/O circuits 240, 242, 244, 246, 248, and 250 into a high impedance state (therefore the corresponding logic input is controlled by transistor 252), switch another I/O circuit into an ON condition, and force the other four I/O circuits into an OFF condition. Such a configuration and sequence provides that a single PWM signal may be utilized to control operation of a three phase ECM.

In this embodiment, where PWM output 202 is directly coupled to transistor switch 252, the result is a voltage control configuration rather than a current control configuration. Processing device 204 monitors the level of motor current in other ways. If the motor has a high enough impedance that motor current can stay within safe limits, current sensing may not be needed. Such a configuration is sometimes referred to as a voltage mode with no current sensing.

Figure 4:
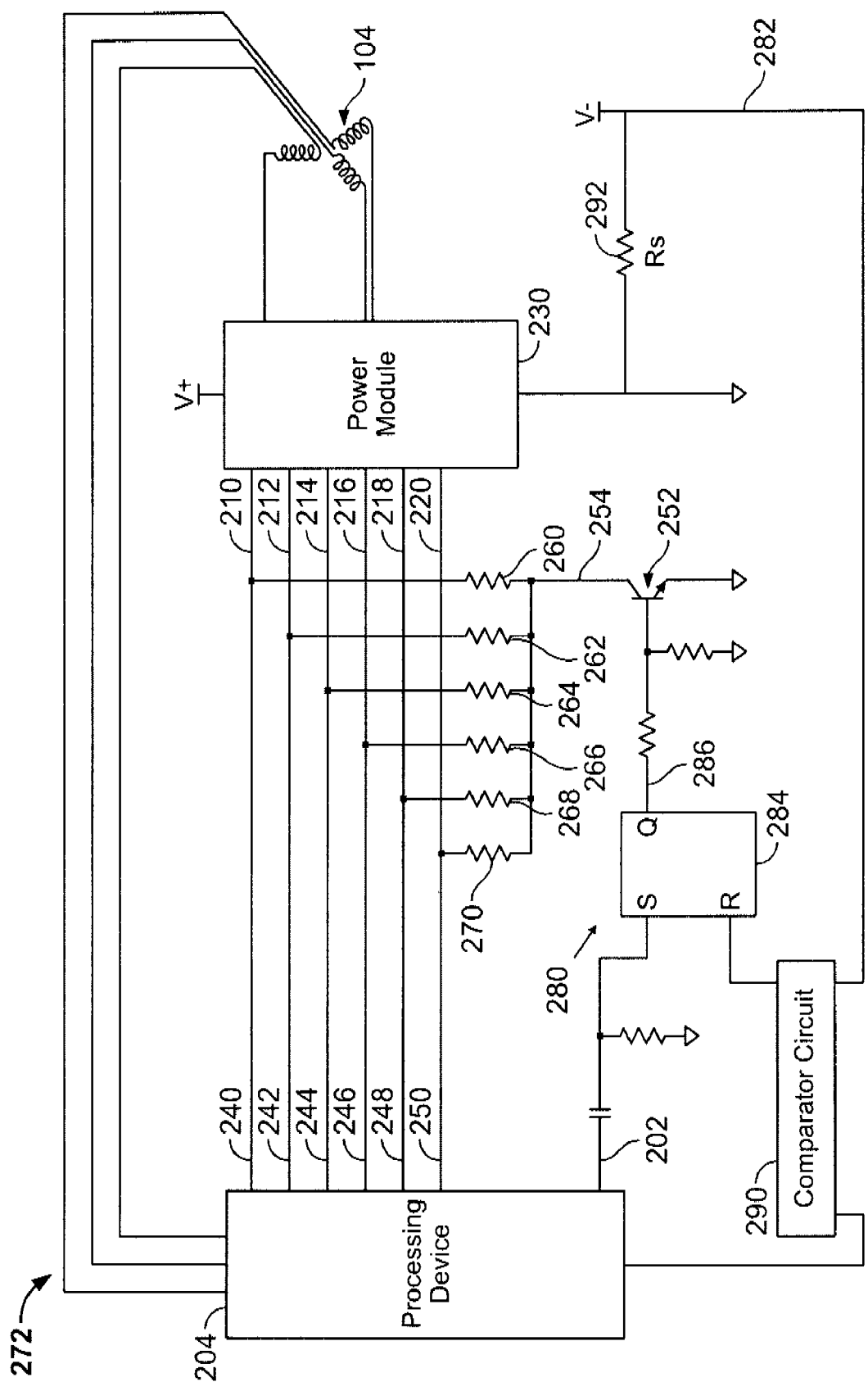
FIG. 4 is a schematic diagram of a controller for an ECM, including a current regulation function, in which the processor includes a single pulse width modulated output.

FIG. 4 is a schematic diagram of a motor controller 272, which includes a current regulation function, capable of being utilized with motor 104. A logic circuit 280 is placed between PWM output 202 and logic inputs 210, 212, 214, 216, 218, and 220 of power output module 230. Logic circuit 280 is configured to modify the PWM control signal (i.e., PWM output 202) in response to a sensed motor current 282, as sensed by a shunt resistor 292, such that current control of motor 104 is achieved outside of processing device 204 (i.e., independent of processing device 204). Having this function separated from processing device 204 increases the robustness of the motor drive by providing a way for motor current to be independently limited in the case of a processing device failure.

PWM output 202 is capacitively coupled to a logic switch, for example, a flip-flop 284, of logic circuit 280. An output 286 of flip-flop 284 drives transistor 252 whose collector 254 connects to six logic inputs 210, 212, 214, 216, 218, and 220 through six resistors 260, 262, 264, 266, 268, and 270 respectively.

Sensed motor current 282, a comparator 290, and flip-flop 284 form a peak current regulation function which can be steered to any of the six inputs 210, 212, 214, 216, 218, and 220 by the six I/O circuits 240, 242, 244, 246, 248, and 250. Processing device 204 provides a desired current level to comparator 290. When current 282 is sensed to be above the desired current level, flip-flop 284 is turned OFF.

By configuring flip-flop 284 such that an initial transition of PWM signal 202 transitions flip-flop 284 into a state where, if an I/O circuit (i.e. one of I/O circuits 240, 242, 244, 246, 248, and 250) is in a high impedance state, a respective input 210, 212, 214, 216, 218, and 220 would be turned ON. Once the state of flip-flop 284 has transitioned to this ON state, an opposite transition of the PWM signal will not flip flip-flop 284 to an OFF state. Rather, sensed motor current 282 is also input into flip-flop 284, through a comparator circuit 290. When the current is sensed to be above a desired level, flip-flop 284 is forced into an OFF state. In another embodiment, the inverted logic may be used, including a PNP transistor being driven from a Q-not output of flip-flop 284 and pulling up the resistor network to a positive voltage.

Use of a resistor network between processing device 204 or other source of motor control signals and a power module on a three phase brushless DC drive, which is being operated in 120 degree conduction mode, allows the motor to be controlled by a single source of pulse width modulation rather than six independent sources of pulse width modulation, providing a cost savings when compared to known multiple PWM source implementations.

To summarize, a system including a single PWM signal is provided to control the operation of an ECM. The PWM signal is coupled to a network, which along with I/O circuits, is coupled to a driver circuit configured to apply signals to windings of an ECM. A control method is also provided for controlling the operation of an ECM utilizing a single PWM signal. Also, a system and control method is provided such that control of the motor current is achieved outside of the processing device.

While the invention has been described in terms of various specific embodiments, those skilled in the art will recognize that the invention can be practiced with modification within the spirit and scope of the claims.

What is claimed is:

1. A method for controlling an operation of an electronically commutated motor (ECM) with an ECM control assembly, said ECM control assembly having a control module, said method comprising:
   applying a single pulse width modulated (PWM) signal to a plurality of inputs of a power output module; and
   controlling a state of a plurality of input/output (I/O) circuits to allow the PWM signal to pass through a respective one of the plurality of power output module inputs and into a respective winding of the ECM at a desired interval, wherein each of the plurality of inputs of the power output module is directly coupled to a separate one of said plurality of I/O circuits.

2. The method of claim 1 further comprising adjusting a duty cycle of the PWM signal to control the operation of the ECM.

3. The method of claim 1 further comprising altering the single PWM signal based on a sensed level of current being drawn by the ECM.

4. The method of claim 1 wherein applying the single PWM signal to the plurality of inputs of the power output module comprises applying the single PWM signal to a common node of a resistor network, each resistor of the resistor network coupled to a respective I/O circuit.

5. The method of claim 2 wherein applying the single PWM signal to the plurality of inputs of the power output module comprises configuring a control module to adjust the duty cycle of the single PWM signal and control the state of the I/O circuit.

6. The method of claim 1 wherein controlling the state of the I/O circuits to allow the PWM signal to pass through a respective one of the power output module inputs and into a winding of the ECM at a desired interval comprises:
   setting a state of a first I/O circuit to allow the PWM signal to be applied to a first node of a winding of the ECM; and
   setting a state of a second I/O circuit to set a second node of the winding to a voltage such that current is allowed to pass through the winding.

7. A unit for providing pulse width modulated (PWM) signals to control operation of an electronically commutated motor (ECM), said unit comprising:
   a power output module configured to apply signals to windings of the ECM, said power output module comprising a plurality of power output module inputs;
   a processing device comprising a single PWM output and a plurality of input/output (I/O) circuits, wherein each of said plurality of power output module inputs is directly coupled to a separate one of said plurality of I/O circuits; and
   a network coupling said single PWM output to said plurality of power output module inputs, said processing device configured to control a state of said I/O circuits thereby controlling through which one of said plurality of power output module inputs the single PWM output is passed for application to a winding of the ECM.

8. The unit of claim 7 wherein said processing device comprises at least one of a processor, a microprocessor, a controller, a microcontroller, a programmable logic controller, and an application specific integrated circuit.

9. The unit of claim 7 wherein said network comprises a resistor network and a transistor, said resistor network receives said single PWM output from said transistor and provides said single PWM output to said I/O circuits.

10. The unit of claim 9 wherein said resistor network is configured with resistance values such that high or low logic levels output by said processing device at said I/O circuits will control corresponding said power output modules regardless of the signal output by said transistor.

11. The unit of claim 7 wherein said network further comprises a switching device and a comparator circuit configured to adjust said single PWM output based on a level of current being drawn by said ECM.

12. The unit of claim 11 wherein said processing device is configured to provide said comparator circuit with a desired current level.

13. The unit of claim 7 wherein said processing device is configured to control said I/O circuits to allow said single PWM output to pass through a respective one of said power output module inputs and into a winding of said ECM at a desired interval.

14. The unit of claim 7 wherein said processing device is further configured to:
   set a state of a first I/O circuit to allow said single PWM output to be applied to a first node of a winding of said ECM; and
   set a state of a second I/O circuit to set a second node of the winding to a voltage such that current is allowed to pass through the winding.

15. The unit of claim 7 wherein said processing device is further configured to adjust a duty cycle of said single PWM output to control operation of said ECM.

16. The unit of claim 7 wherein said single PWM output is directly coupled to a transistor to enable voltage control of the ECM.

17. A system for providing pulse width modulated (PWM) control signals to an electronically commutated motor (ECM), said system comprising:
   an ECM;
   a power output module coupled to said ECM, said power output module comprising a plurality of power output module inputs; and
   a unit comprising a processing device comprising a PWM output and a plurality of input/output (I/O) circuits, said unit further comprising a network coupling said PWM output to each of said plurality of inputs of said power output module, wherein each of said plurality of inputs of said power output module is also coupled to a separate one of said plurality of I/O circuits, said processing device configured to control the state of said I/O circuits, thereby controlling through which one of said plurality of power output module inputs the PWM output is passed for application to a winding of said ECM.

18. A system according to claim 17 wherein said network comprises a resistor network and a transistor, said resistor network receives said PWM output from said transistor and provides said PWM output to said I/O circuits.

19. A system according to claim 18 wherein said resistor network is configured with resistance values such that high or low logic levels output by said processing device at said I/O circuits will control corresponding said power output modules regardless of the signal output by said transistor.

20. A system according to claim 17 wherein said network further comprises a switching device and a comparator circuit configured to adjust said PWM output based on a level of current being drawn by said ECM.

21. A system according to claim 20 wherein said processing device is configured to provide said comparator circuit with a desired current level.

22. A system according to claim 17 wherein said processing device is configured to control said I/O circuits to allow said PWM output to pass through a respective one of said power output module inputs and into a winding of said ECM at a desired interval.

23. A system according to claim 17 wherein said processing device is further configured to:
set a state of a first I/O circuit to allow said PWM output to be applied to a first node of a winding of said ECM; and
set a state of a second I/O circuit to set a second node of the winding to a voltage such that current is allowed to pass through the winding.

24. A system according to claim 17 wherein said processing device is further configured to adjust a duty cycle of said PWM output to control operation of said ECM.

25. A system according to claim 17 wherein said PWM output is directly coupled to a transistor to enable voltage control of said ECM.

* * * * *